Oct. 16, 1956  C. C. HURD  2,766,842
FILTER MOUNTING MEANS
Filed Sept. 2, 1954  3 Sheets-Sheet 1
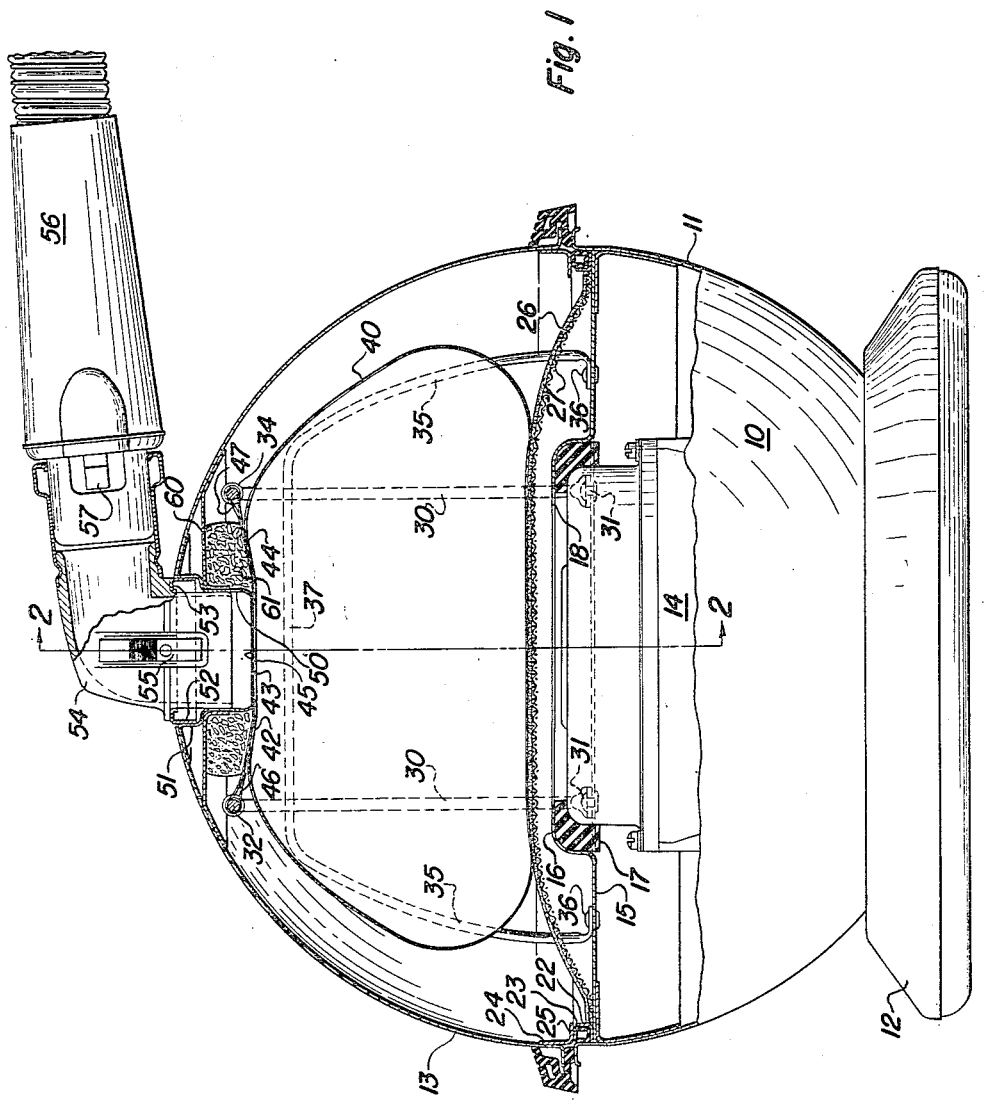

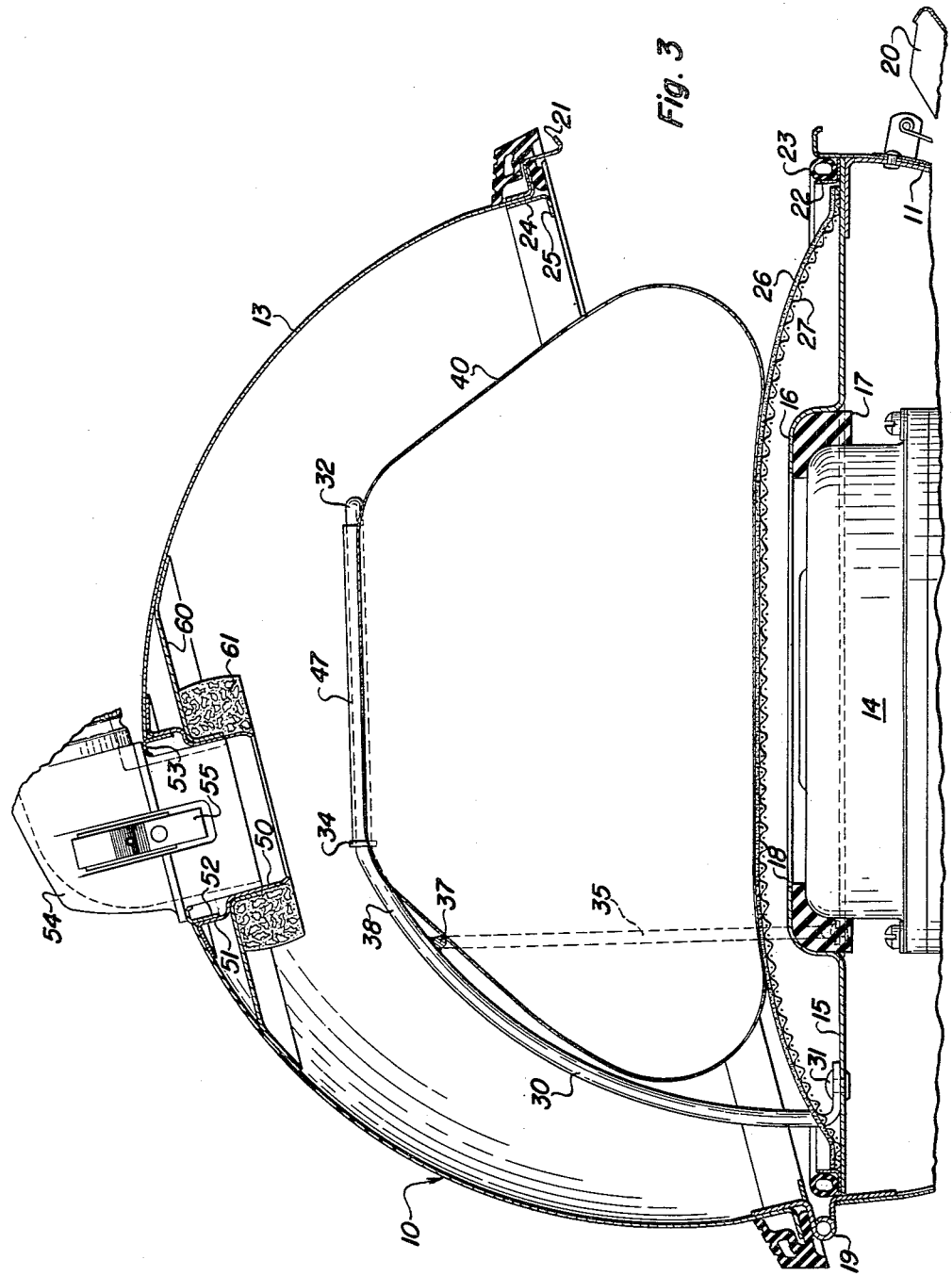

United States Patent Office 2,766,842
Patented Oct. 16, 1956

2,766,842

FILTER MOUNTING MEANS

Claud C. Hurd, North Canton, Ohio, assignor to The Hoover Company, North Canton, Ohio, a corporation of Ohio Application September 2, 1954, Serial No. 453,786

15 Claims. (Cl. 183—37)

The instant invention relates to suction cleaners and more particularly to a novel means for mounting a filter bag within a suction cleaner.

It is a prime object of the instant invention to provide a novel structure for mounting a filter bag within a suction cleaner including a novel filter bag construction for use with said mounting means.

It is another object of the instant invention to provide a novel mounting means for a filter bag in a suction cleaner including a pair of suspending arms for engaging the filter bag to suspend it in operative position in the suction cleaner for connection with the air inlet conduit thereof.

It is a further object of the instant invention to provide a novel mounting means for a filter bag in a suction cleaner including a pair of biased arms for suspending a wall of the filter bag containing the filter bag mouth and applying tension to said wall, to provide a firm seat for the air inlet conduit for making connection between it and the filter bag mouth.

It is also an object of the instant invention to provide a novel mounting means for a filter bag in a suction cleaner including means for supporting a wall of the filter bag containing the filter bag mouth under tension, to provide a firm surface surrounding the filter bag mouth for seating a sealing gasket to make an air-tight seal between the air inlet conduit of the cleaner and the filter bag mouth.

Another object of the instant invention is to provide a filter bag including a novel mounting means comprising slings by which the filter bag may be suspended in the suction cleaner in operative position to be connected to the air inlet conduit thereof.

A further object of the instant invention is to provide a filter bag including a novel mounting means therefor comprising a strap secured to a wall of the filter bag containing the filter bag mouth, the strap terminating in oppositely directed slings on either side of the mouth for supporting the wall of the filter bag under tension to provide a firm surface for seating the air inlet conduit to make connection between said conduit and the mouth of the filter bag.

Still another object of the instant invention is to provide a filter bag having a novel mounting means for supporting the filter bag with the wall thereof containing the filter bag mouth suspended under tension to provide a firm surface against which a resilient gasket may be seated to make an air-tight seal between the air inlet conduit and the filter bag mouth.

It is also an object of the instant invention to provide a simple mounting structure in a suction cleaner for the filter bag, facilitating assembly of the filter bag therewith, and providing a positive means for engaging the air inlet conduit and a resilient sealing element with the filter bag mouth for providing an air-tight seal at the junction of the air inlet conduit and the mouth.

Further objects and advantages of the instant invention will be apparent to those skilled in the art from a consideration of the detailed description of a preferred embodiment thereof which follows, reference being had to the drawings in which:

Fig. 1 is an elevational view partly in section of a suction cleaner incorporating the instant invention;

Fig. 3 is a view similar to Fig. 2 with the upper and lower cleaner casing sections partially separated.

Figure 4:
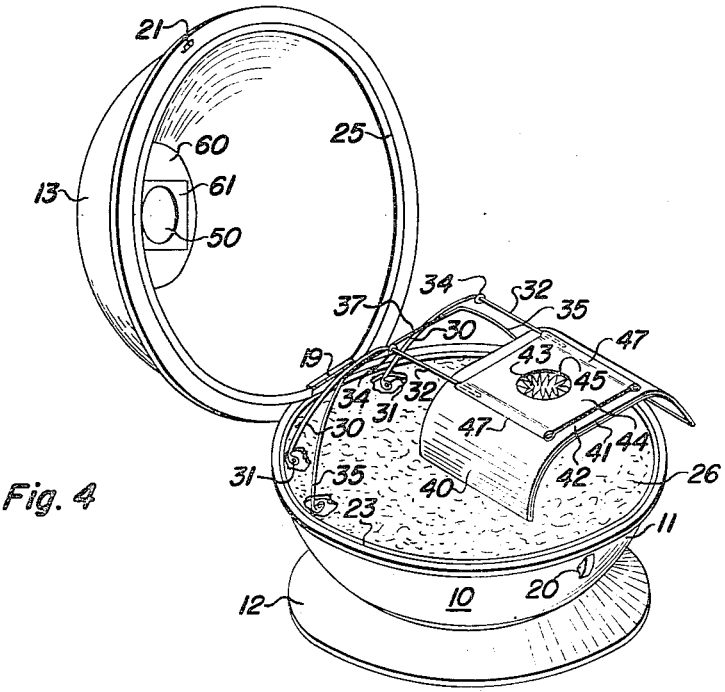
Fig. 4 is a perspective view of a suction cleaner incorporating the instant invention.
Figure 2:
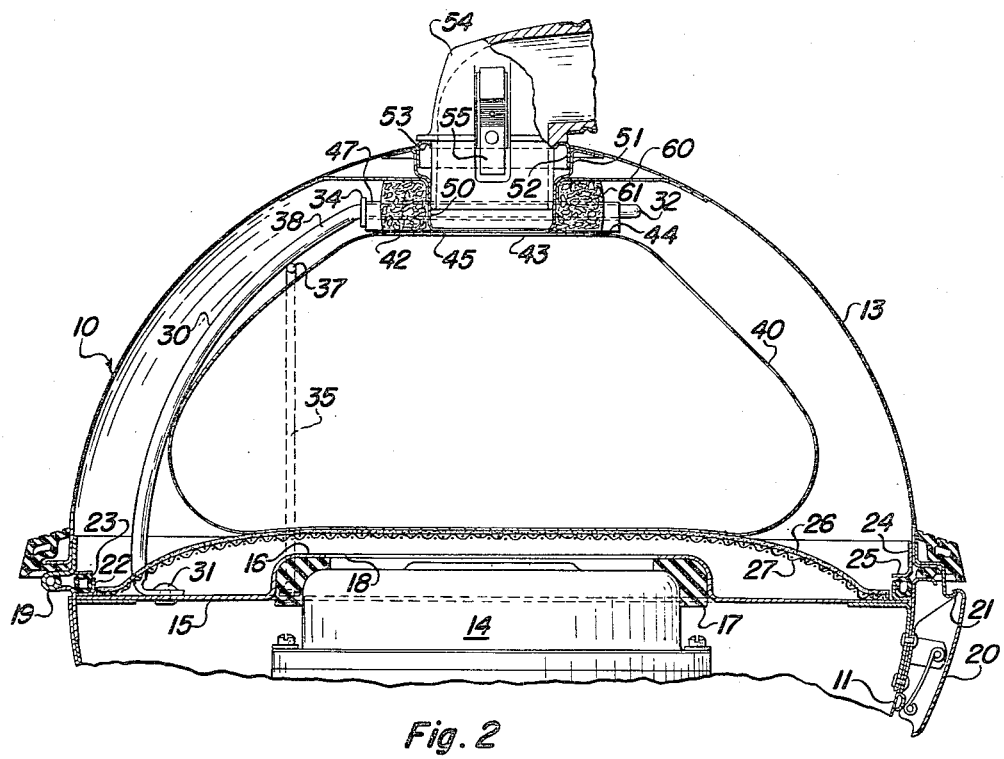
Fig. 2 is a view taken on the line 2—2 in Fig. 1.

The instant invention in a filter bag mounting means is illustrated in a preferred embodiment thereof as applied to a spherical suction cleaner 10 having a lower hemispherical casing section 11 supported on a suitable base 12 and an upper hemispherical casing section 13 separably joined to the lower casing section 11 on a horizontally disposed diametrical line. A motor-fan unit 14 for creating a suction flow of air is centrally located and suitably supported within the lower casing section 11. A partition or bulkhead 15 covers the lower casing section 11 and includes a recessed central portion 16 providing a seat for an annular resilient gasket 17 against which the top of the motor-fan unit 14 bears. The major area of the recessed central portion 16 of the partition 15 is cut away to leave an opening 18 for communication between the fans of the motor-fan unit 14 and the filter bag 40.

The lower and upper casing sections 11, 13 are connected by a hinge 19 permitting pivoting of the upper casing section 13 with respect to the lower casing section 11 for separation of said casing sections to provide access to the filter bag 40, and a conventional toggle latch 20 is provided on the lower casing section 11 opposite the hinge 19 to engage a lip 21 on the upper casing section 13 for joining said sections together. An annular angle-section element 22 is secured to the upper side of partition 15 adjacent the rim of the lower casing section 11 to provide an annular recess between the upstanding leg of the element 22 and the inner wall of the lower casing section 11 for seating an annular gasket 23 therein.

The upper casing section 13 includes an annular angle-section element 24 having one leg thereof secured to the inside wall of said casing section with the other leg thereof extending laterally inwardly constituting a flange 25 depending slightly below the rim of the casing section 13. The flange 25 is positioned to bear on the annular gasket 23 to provide an airtight seal between the two cleaner casing sections upon closing the one section on the other. The latch 20 serves to maintain the upper casing section 13 closed on the lower casing section 11, pressing the casing sections together to maintain the seal.

A dish-shaped secondary filter 26, supported by a wire mesh screen backing 27 is loosely supported on the partition 15 and covers the central opening 18 therein to close the lower casing section 11. The secondary filter 26 is impervious to dust and like litter to protect the motor-fan unit 14 from the accumulation of dirt impairing the efficiency thereof, but is pervious to air so as not to obstruct the passage of the air stream between the filter bag and the fans of the motor-fan unit. The secondary filter 26 also serves as a support for the bottom of the filter bag as will be explained in greater detail below.

A pair of upstanding posts 30 are secured to the partition 15 by rivets 31 or the like and rise from the lower casing section 11 in parallel spaced relation to each other, arching inwardly in a shallow curve towards the vertical center line of the cleaner casing. Integrally formed with the top of each of the posts 30 is a laterally extending arm 32 including an integral stop collar 34 at the junction of the arm 32 with the post 30. A bracing arch 35 having its ends secured to the partition 15 by rivets 36 or the like rises from the partition, extending laterally of the posts 30 and lying thereunder, the arch having a flat central portion 37 disposed under the posts 30, each of the posts 30 being secured thereto by welding or the like for rigidly supporting them on the partition 15 and the lower casing section 11. The posts 30 and the arms 32 are preferably made of rod stock of relatively light weight, but having sufficient weight and rigidity to support themselves in their preformed shape. A short length 38 of the posts 30 extends beyond the bracing arch 35 in order to permit the suspending arms 32 to give under pressure, the resiliency deriving from the inherent springiness of the material of which they are formed.

In accordance with the instant invention the suspending arms 32 are symmetrically located with respect to the air inlet conduit 50 and are adapted to suspend the filter bag 40 within the confines of the upper hemispherical casing section 13 with the mouth 43 of the filter bag 40 centrally located between the suspending arms 32 in aligned position with the air inlet conduit for connection thereto. With the filter bag 40 thus mounted within the suction cleaner 10 it will hang downwardly from the suspending arms 32 with its bottom being disposed adjacent the secondary filter 26. Upon filling of the bag 40 with dirt and like litter it will sag downwardly against the secondary filter 26 which will support the underside of the filter bag 40 to prevent accidental rupturing thereof due to the weight of the material contained therein. The secondary filter 26 also serves the function of keeping the filter bag 40 spaced from the central opening 18 in the partition 15 so that the suction pressure of the motor-fan unit 14 may be applied to the full filter area of the filter bag 40 for most effective cleaning action.

This invention further includes a novel filter bag construction for mounting the same on the suspending arms 32. The novel construction described herein may be applied to any one of a plurality of conventional filter bags, one form being illustrated in the drawings. These filter bags are preferably of the disposable type made of a relatively inexpensive air pervious paper adapted to be filled and discarded. The illustrated filter bag 40 is of a form which may be folded flat for convenience in packaging and shipping, and comprises a plurality of pleats or folds 41 in the side walls thereof, permitting expansion of the filter bag 40 as shown in Fig. 1 from the folded-flat condition illustrated in Fig. 4, in order to utilize the full filter area of the bag. The top wall 42 of the filter bag 40 includes a centrally disposed mouth 43 having a lanced opening for connection with the air inlet conduit 50.

A strap 44 having a substantially square or rectangular shape is secured to the wall 42 of the filter bag 40 by an adhesive or the like on a substantial area of the wall 42 surrounding the filter bag mouth 43. The strap 44 includes a centrally disposed opening 45 aligned with the mouth 43 and providing access thereto for the air inlet conduit 50. The opposite ends 46 of the strap 44 are folded under and cemented or otherwise secured to the underside of the strap to form slings 47 on either side of the filter bag mouth 43 and oppositely directed with respect thereto. It will be apparent to those skilled in the art that the slings 47 may also be formed without the strap 44 and secured to the wall 42 of the filter bag 40 by any conventional means, the illustrated embodiment being a preferred form of the invention in which the strap provides a double thickness of material on the filter bag wall 42, reinforcing this area of the filter bag for reasons that will be apparent as the description proceeds. The wall 42 surrounding the mouth 43 may be still further reinforced by making the strap 44 of heavier paper stock than that from which the bag 40 is made, or alternatively other materials having greater strength than paper may be used for the strap.

The filter bag 40 is assembled within the suction cleaner 10 by telescoping the suspending arms 32 within the bights of the slings 47. The stop collars 34 at the rear ends of the suspending arms 32 function to accurately position the filter bag 40 on the suspending arms 32 with the mouth 43 thereof in alignment with the air inlet conduit 50 for connection thereto. The distance between the bights of the oppositely directed slings 47 is slightly less than the distance between the suspending arms 32. Thus upon telescoping the slings 47 over the arms 32, the latter will be drawn toward each other very slightly, such movement being permitted by the inherent resiliency of the posts 30, as described above. The strap 44 and the portion of the filter bag wall 42 secured thereto surrounding the mouth 43 will be supported between the suspending arms 32 in a tautly stretched condition providing a firm seating surface for the air inlet conduit 50, the reinforced area of the filter bag wall 42 sustaining the tension applied thereto.

Centrally disposed in the top of the upper casing section 13 is the air inlet conduit 50 formed with an enlarged diameter portion 51 adjacent the inner wall of the casing section, the conduit 50 being secured thereto by welding or the like. An annular inverted L-section element 52 is secured within the enlarged diameter portion 51 of the air inlet conduit 50 to provide an inwardly directed latch engaging lip 53. A hose connector 54 is received in the air inlet conduit 50 and includes a suitable spring-pressed latch 55 for engaging the lip 53 formed by the L-section element 52, and swivelly securing the hose connector 54 therein in air-tight engagement with the air inlet conduit 50. A conventional cleaning tool hose 56 may be attached to the hose connector 54 by engagement of the usual spring-pressed latch 57 with an annular lip formed at the outer end of the hose connector 54 in the manner well-known in the art.

An auxiliary inner wall 60 presenting a flat surface is secured to the top of the upper casing section 13 surrounding the air inlet conduit, as by welding or the like. A soft annular sealing element 61, preferably made of soft rubber or like material, is seated on the auxiliary wall 60 surrounding the air inlet conduit 50. The sealing element 61 has a square or rectangular outer configuration to correspond to the shape of the strap 44.

To install the filter bag 40 in the suction cleaner 10, the upper casing section 13 is pivoted upwardly away from the lower casing section 11, exposing the suspending arms 32. The filter bag 40 may then be mounted by telescoping the slings 47 over the suspending arms 32 as illustrated in Fig. 4. As previously described, the strap 44 and the filter bag wall portion 42 attached thereto and containing the filter bag mouth 43 will be supported between the suspending arms 32 under tension due to the strap 44 being stretched between the said arms. The upper casing section 13 is then closed on the lower casing section 11 as illustrated in Fig. 3 to connect the air inlet conduit 50 to the aligned filter bag mouth 43.

The arrangement of the various elements of the novel filter bag mounting structure is such that the air inlet conduit 50 projects below the suspending arms 32. The sealing element 61 surrounding the air inlet conduit 50 is coextensive therewith and also projects below the suspending arms 32. Accordingly, upon closing the casing sections, the air inlet conduit 50 and the sealing element 61 will bear down upon the strap 44 between the suspending arms 32. The opening in the bottom of the air inlet conduit 50 is of slightly greater diameter than the opening 45 in the strap and the mouth 43 of the filter bag 40 so that the bottom of the air inlet conduit 50 will seat on the strap 44 rather than project into the filter bag mouth 43.

Due to the pressure applied to the strap 44 as a result of assembling the elements as above described, the strap 44 and the attached portion of the wall 42 of the filter bag 40 will be deformed to a dish shape with the sealing element 61 sandwiched between the strap 44 and the auxiliary wall 60. The sealing element 61 abuts the strap 44 and the wall 42 of the filter bag 40 over a substantial area surrounding the filter bag mouth 43, to provide an air-tight seal at the junction of the air inlet conduit 50 and the filter bag mouth 43. In the course of engaging the air inlet conduit 50 and the sealing element 61 with the strap 44, the suspending arms 32 and the portions 38 of the posts 30 beyond the bracing arch 35 will give slightly due to their inherent resiliency, the strap 44 being of sufficient strength to pull on these elements without tearing. In order to further supplement the pressure engagemeent between the air inlet conduit 50 and the filter bag mouth 43, the suspending arms 32 are directed upwardly from their junction with the posts 30 at a slight angle. Thus the suspending arms 32 will be bent downwardly slightly upon connection of the air inlet conduct 50 to the filter bag mouth 43 when the cleaner casing is closed.

It is to be understood that the foregoing description is of a preferred embodiment of the instant invention and is merely exemplary. Modifications thereof falling within the scope of the invention will occur to those skilled in the art. Accordingly, it is not intended that the instant invention be limited except a set forth in the claims which follow.

I claim:

1. In a suction cleaner having a motor-fan unit for creating a suction flow of air, an air inlet conduit, and a filter bag having a mouth in a wall thereof for communication with said air inlet conduit, said filter bag including a sling, and means adapted to be received in said sling for suspending the filter bag in the cleaner with the mouth in aligned position with the air inlet conduit for connection therewith.

2. In a suction cleaner having a motor-fan unit for creating a suction flow of air, an air inlet conduit, and a filter bag having a mouth in a wall thereof for communication with said air inlet conduit, said filter bag including slings extending to opposite sides of the mouth, and means adapted to be received in said slings for suspending the filter bag in the cleaner with the mouth therebetween in aligned position with the air inlet conduit for connection therewith.

3. In a suction cleaner as recited in claim 2 in which said means comprises cantilever arms adapted to be received in said slings coextentively therewith.

4. In a suction cleaner having a motor-fan unit for creating a suction flow of air, an air inlet conduit, and a filter bag having a mouth in a wall thereof for communication with said air inlet conduit, said filter bag including a suspending strap secured to said wall in proximity to the filter bag mouth, said strap comprising a sling, and means adapted to be received in said sling for suspending the filter bag in the cleaner with the mouth thereof in aligned position with the air inlet conduit for connection therewith.

5. In a suction cleaner having a motor-fan unit for creating a suction flow of air, an air inlet conduit, and a filter bag having a mouth in a wall thereof for communication with said air inlet conduit, said filter bag including a suspending strap secured to said wall overlying the filter bag mouth and having an opening therein providing access to said mouth, said strap comprising slings extending to opposite sides of the mouth, and means adapted to be received in said slings for suspending the filter bag in the cleaner with the mouth thereof in aligned position with the air inlet conduit for connection therewith.

6. In a suction cleaner as recited in claim 5 in which said means comprises supporting arms extending transversely of the filter bag wall for reception within said slings to suspend the wall therebetween.

7. In a suction cleaner as recited in claim 6 in which the supporting arms are biased for maintaining the strap and the attached wall portion in a stretched condition therebetween to support the strap and wall therebetween under tension providing a firm seat for connection with the air inlet conduit.

8. In a suction cleaner as recited in claim 7 including a resilient sealing element surrounding the air inlet conduit adapted to abut the supported strap and attached wall portion to provide a sealed connection between the air inlet conduit and the filter bag mouth.

9. A filter bag having a mouth in a wall thereof for communication with the air inlet conduit of a suction cleaner, means for mounting said bag in the cleaner comprising a sling secured to said wall in proximity to the mouth, for the reception of means suspending the filter bag in the suction cleaner with the mouth in aligned position with the air inlet conduit for connection thereto.

10. A filter bag having a mouth in a wall thereof for communication with the air inlet conduit of a suction cleaner, means for mounting said bag in the cleaner comprising slings extending to opposite sides of the filter bag mouth for the reception of means suspending the filter bag in the cleaner and supporting the wall portion between said slings with the filter bag mouth in aligned position with the air inlet conduit for connection thereto.

11. A filter bag having a mouth in a wall thereof for communication with the air inlet conduit of a suction cleaner, means for mounting the bag in the cleaner comprising a strap secured to said wall on a substantial portion of the width thereof overlying the filter bag mouth and having an opening therein providing access to said mouth, said strap including elongated slings extending to opposite sides of the mouth and laterally of the wall for suspending the filter bag and stretching the strap and the attached wall portion for maintaining them in a taut condition with the mouth in alignment with the air inlet conduit, to provide a firm seat for the air inlet conduit and for a resilient seal surrounding the conduit, for connection of the air inlet conduit and filter bag mouth with an air-tight seal therebetween.

12. In a spherical suction cleaner having separable hemispherical casing sections, a motor-fan unit in one of said casing sections, an inlet conduit in a second casing section, a filter bag having a mouth in a wall thereof for communication with the air inlet conduit, said filter bag being disposed in said second casing section and including slings extending to opposite sides of the filter bag mouth, means secured to said one casing section for mounting the filter bag in the cleaner including supporting arms spaced from the motor-fan unit for reception in the slings, said arms being disposed within the second casing section for suspending the filter bag within the confines of the second casing section with the mouth in aligned position with the air inlet conduit for connection thereto.

13. In a spherical suction cleaner as recited in claim 12 in which the slings are secured to said wall of the filter bag in contiguity to the mouth, and including posts rising from said one casing section, said supporting arms being integral with said post tops and extending laterally with respect to the air inlet conduit, said arms being biased to support the filter bag wall under tension providing a firm seat for the air inlet conduit.

14. In a spherical suction cleaner as recited in claim 12 in which the filter bag includes a strap overlying the mouth and secured to the wall in contiguity to the mouth, said slings being integrally formed with the strap at opposite ends thereof on opposite sides of the mouth, posts rising from said one casing section, said arms being integral therewith and extending laterally with respect to the air inlet conduit, said arms being biased to support the strap and the attached wall portion under tension providing a firm seat for the air inlet conduit.

15. In a suction cleaner as recited in claim 14 in which the air inlet conduit includes a resilient sealing element adapted to abut against the strap and attached wall portion to provide an air-tight seal between the mouth and the air inlet conduit.

References Cited in the file of this patent

UNITED STATES PATENTS

| | | |
|---|---|---|
| 2,050,605 | Gordon et al. | Aug. 11, 1936 |
| 2,400,558 | Lindberg | May 21, 1946 |
| 2,596,806 | Borkoski | May 13, 1952 |